INVENTOR.
Julius J.Torok.
BY O.B. Buchanan

Jan. 25, 1955 J. J. TOROK 2,700,720

THERMISTOR

Filed Dec. 15, 1948

5 Sheets-Sheet 2

INVENTOR.

Julius J. Torok.

BY O. B. Buchanan

Jan. 25, 1955  J. J. TOROK  2,700,720

THERMISTOR

Filed Dec. 15, 1948  5 Sheets-Sheet 3

INVENTOR.
Julius J. Torok.
BY O. B. Buchanan

Jan. 25, 1955 J. J. TOROK 2,700,720

THERMISTOR

Filed Dec. 15, 1948

5 Sheets-Sheet 4

INVENTOR.

Julius J. Torok.

BY O. B. Buchanan

INVENTOR.
Julius J. Torok.
BY O. B. Buchanan

United States Patent Office 2,700,720
Patented Jan. 25, 1955

2,700,720

THERMISTOR

Julius J. Torok, Beaver, Pa.

Application December 15, 1948, Serial No. 65,337
15 Claims. (Cl. 201—63)

My invention relates to thermistors, their compositions, their methods of preparation, their mountings, and their circuits.

A thermistor, or a thermally sensitive resistor, may be defined as a thermally sensitive, solid, semi-conductive, composition resistance-element, having a large negative temperature-coefficient of electrical resistance. The term may be applied to such an element in either its mounted or unmounted state. If two such elements are mounted in a single structure, with means for focusing radiation on only one of them, the assembly is sometimes more specifically called a bolometer, but it may also be included in the general sense of the word thermistor.

My present invention is more particularly related to thermistors which are used with such low currents passing through them that these currents have negligible heating effects on the thermistors. This usually entails the use of electronic circuits which are responsive to the voltage-drops in the thermistors.

It has been known, for over a century, that many semi-conductors have large temperature-coefficients, usually negative; but it has only been within about the last quarter of a century that it has been possible to make any appreciable industrial use of such a substance, as a sensitive and more or less reliable temperature-responsive device. The development of practical thermistors has been, and still is, hampered by our limited knowledge of crystallization-properties, and by our limited knowledge of the nature of the electrical conductivity which takes place in semi-conductors. In a 1946 AIEE paper, Becker, Green, and Pearson called attention to the discouraging fact that the resistance of some semiconductors can vary by factors up to a thousand or a million, as a result of surprisingly small amounts of certain impurities, or as a result of the heat-treatment which was used in their preparation, or as a result of various attempts to make reliable and permanent terminal-contacts thereto, or as a result of their treatment during life or use; and the further fact that the same unit may be subject to resistance-changes, by factors of two to ten, when held for small times at even the moderate temperatures to which they normally responded.

Even to the present day, available thermistors are limited to low temperatures, usually below 250° C. or 300° C. at the highest; but even at such low temperatures they are in general not stable, will often not repeat their indications on subsequent readings, are frequently sluggish in their response to temperature-changes, usually have silver terminals which weaken or melt at 800 or 850° C., and are usually associated with control-circuits which are sensitive to their input-voltage or are otherwise unsatisfactory.

There is need for a more satisfactory thermistor, and for a small low-cost electronic circuit therefor, having as wide a range of temperature-responses as possible, particularly in the range between 350° C. and 1000° C. or 1100° C. or even 1200° C.

In my extended search for such a thermistor, I have had to discard the silicates (sand, ceramics or glasses) as having a conductivity which is too variable with time; I have had to discard the carbides since the carbon burns out at high temperatures; and I have had to discard most of the metal-oxides as being either unstable chemically, or as having a memory or a failure to return instantaneously to any initial condition of semiconductivity after being subjected to a temporary temperature-change, or as having a drifting temperature-characteristic which changes from day to day or from minute to minute, or as being non-reproducible in commercial units all having the same or similar characteristics.

In fact, chromic oxide, $Cr_2O_3$, is the only metal-oxide, which I have found, which does not change its oxygen-composition (that is, which does not change to other oxides) at temperatures of the order of 1500° C., more or less. Sintering gives chromic-oxide powder a negative temperature-coefficient and a permanent structure, whereas the use of a bonding-material would give it a positive temperature-coefficient which is subject to variable contact-phenomena. Chromic oxide does not fuse until around 2000° C., but, like most other metal-oxides, it begins to volatilize long before its fusing-temperature is reached, so that, if a mixture of metal-oxides including chromic oxide were heated, it would permanently change its percentage-composition at temperatures considerably lower than 2000° C. Good sintering of chromic-oxide powder, or mixtures of powders, is obtained (within reasonable lengths of time) only at temperatures above 1400° C., and preferably above 1450° C.

An object of my invention is to provide a sintered all-oxide thermistor-element consisting either substantially entirely of chromic oxide, or mainly of chromic oxide, and preferably having terminals of platinum permanently bonded thereto. In general, more than 80% of my sintered composition-material is chromic oxide, and in some instances the chromic-oxide concentration may reach more than 85%, sometimes more than 90%, and sometimes 100% or pure sintered chromic oxide.

A further object of my invention is to provide certain specific sintered oxide-mixtures consisting mainly of chromic oxide, but with small percentages of any one (or sometimes more) of certain preferred diluents, which are oxides of other metals, which act either as activators (reducing the resistivity of the sintered mixture) or as poisons (increasing the resistivity of the sintered mixture), or which produce more stable or reproducible elements, as will be subsequently described.

A further object of my invention is to provide a new method of making a sintered-oxide thermistor or other heat-resistant composition-body, including the use of small amounts of a volatile deflocculating agent and a heat-dissociable adhesive-agent, and sometimes also a bismuth-trioxide powder (for a recrystallizing-agent, to repair the crystals which were broken in the process of crushing chromic oxide to powder it). These deflocculating, adhesive, and recrystallizing agents are all substantially completely driven off, either prior to, or during, the sintering-process.

A further object of my invention is to provide a new platinum (or noble-metal) terminal for composition-resistors, and a new method of applying the same, resulting in a better-adhering and more heat-resistant terminal than has been available heretofore.

With the foregoing and other objects in view, my invention consists of the compositions, thermistor-element, structures, circuits, parts, combinations, systems, and methods of manufacture and use, hereinafter described and claimed, and illustrated in the accompanying drawings, wherein:

Figs. 6*a* to 16*a* are approximate resistivity-curves for various other representative thermistor-compositions embodying my invention, plotting resistivity against temperature, and Figs. 6*b* to 16*b* are corresponding curves plotting resistivity against the percentages of various diluent-oxides which are added to chromic oxide.

Figures 1, 2:
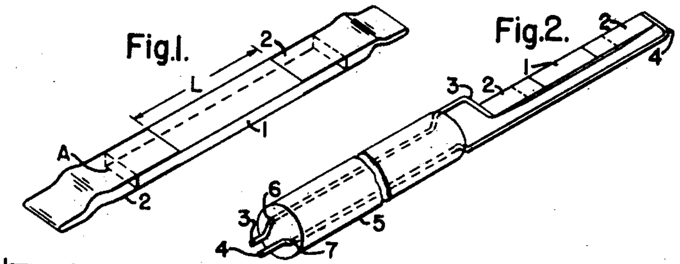
Figure 1 is a double-scale perspective view of a preferred form of thermistor-element embodying my invention.
Fig. 2 is a perspective view illustrating the preferred mounting-structure for a single-element thermistor.

As shown in Fig. 1, I prefer to make my thermistor-elements in the form of small thin flat elongated strips 1 of sintered chromic-oxide or a sintered mixture of certain metal-oxides of which the chief constituent is chromic-oxide, although I am not limited to such a strip-formation. The mixture, in its final composition, should be substantially free of nonoxidized metal or of any other non-oxide ingredient. The strip 1 has two metallic terminals or terminal-connections 2 which are permanently bonded thereto, one at each end, as will be subsequently described. An illustrative strip, on an enlarged two-to-one scale, is shown in Fig. 1.

An important advantage of using sintered chromic oxide as the sole or principal ingredient for thermistor-elements is that this material is quite dark in color—a greenish black—so that it has the property of a black-body heat-absorber, which readily absorbs the heat-radiations impinging thereupon, instead of reflecting most of such radiations, as in many previous thermistor-elements, which have been white or light in color, or poor heat-absorbers.

While my invention is applicable to thermistor-bodies having any of the conventional shapes, it is frequently quite desirable, for several reasons, for the thermistor-element to have a special shape in accordance with my invention. The preferred shape and dimensions of the thermistor-element depend upon the rapidity of the temperature-changes of the furnace whose temperature is to be controlled, or upon the other exigencies of the use to which the element is to be put.

For controlling the temperature of a small furnace, or for otherwise responding to rapidly changeable temperatures, I prefer a thermistor-strip 1 which is quite thin, with a thickness of the order of 1 to 2 millimeters, more or less, or say between about 0.2 and 15 millimeters, so that it will heat through or cool off quickly, when it is subjected to temperature-variations, so that it will respond substantially instantaneously to temperature-changes. The smallest element which I have made was 0.19 mm. thick, 0.26 mm. wide, and 0.47 mm, long, which is about as small as can be made with the naked eye. The minimum limit of strip-thickness is dictated by considerations of strip-strength and manufacturing tolerances. For such applications of thermistors, the strip 1 should be small in mass, for a similar reason, namely so that its thermal capacity will be small, enabling the strip to respond quickly to temperature-changes. In bolometer-elements, in particular, where the activating-energy is small, a thin thickness and a small thermal capacity are very desirable, in the element, so that it will respond rapidly to small changes in the radiant energy.

For controlling the temperature of a large furnace, such as most commercial furnaces, where the temperature-swings are slower, a quick response of the thermistor-element, and a small requirement as to the amount of thermal energy-input which is necessary to change the temperature of the element, are not so essential, and it may frequently be desirable to use more rugged elements, having a thickness up to perhaps 75 millimeters.

For most, but not necessarily all, applications of thermistors, the strip 1 should preferably be elongated, that is, it should generally or preferably have an effective length which is greater than its width. This reduces the capacitance, which is frequently a limiting factor when an alternating-current bridge-circuit is used with the thermistor, as will subsequently be described. It also minimizes the heat-exchange with the two stiff wire leads (not shown in Fig. 1) which will have to be attached to the ends of the strip for the double purpose of supporting the same and conducting current to and from the same.

The shape of the thermistor-strip 1 has a direct effect upon its lengthwise resistance R. If the shape is expressed as a form-factor FF, defined as the ratio of the cross-sectional area A, in cm.$^2$, to the effective length L, between terminals, in cm., then the resistance R of the strip is related to the resistivity $\rho$ of the strip-material, in ohm-centimeters or ohms/cm.$^3$, in accordance with the formula, $\rho=(FF).R$. The effective length L of any particular thermistor-element which is provided with permanently bonded platinum terminals 2 in accordance with my invention, is definite and non-variable, so that the thermistor-resistance R does not vary because of variations in the terminal-connections. However, the actual value of the effective length L is hard to estimate, for lack of knowledge of the precise manner in which the current distributes itself in the portions of the element which are covered by the terminals. Since the resistivity can only be calculated by multiplying the resistance R by the cross-sectional area A, and dividing by the estimated effective length L, the actual value of the resistivity is hard to estimate exactly. This does not detract, however, from the performance of the thermistor.

In order to provide a thermistor which is promptly and accurately responsive to temperature-changes, with little disturbance due to the temperature of the leads, and with sufficient thickness to have the requisite mechanical strength and to be readily manufactured under sufficiently controllable or reproducible conditions, I have used, and prefer to use, form-factors FF in the range between about 0.01 and about 0.5, in different types of thermistors made in accordance with my invention, although I am not limited to this range of form-factors, as previously indicated.

The thinness of the strip, its greater length than width, and its preferable range of form-factors FF, all impose limitations on the size of the strip, including its width and its effective length, as well as its thinness.

There are practical limits as to the permissible resistance R of a thermistor-strip, because the thermistor-temperature is measured, or responded to, by measuring, or responding to, the IR voltage-drop in the thermistor, as the thermistor-temperature varies over the effective or useful temperature-range of the thermistor, while a current I is being passed therethrough. When trying to read, or to respond to, resistances as high as a megohm, small leakages make so much trouble that this may be taken as the upper practicable limit of the maximum resistance $R_{max}$ of any desirable or preferable thermistor-element, or the thermistor-resistance at its lowest operating-temperature. On the other hand, if the minimum resistance $R_{min}$ of the thermistor-element is too low, the resistance of the leads becomes too big a factor, so that it is desirable, for this reason, that the minimum resistance $R_{min}$ of the thermistor-element, that is, the thermistor-resistance at its highest operating-temperature, shall be greater than 5 ohms, in any desirable or preferable thermistor-element.

Since the resistance R of any given thermistor-element may vary anywhere between a tenfold and a thousand-fold range, or more, depending upon the temperature-coefficient and the effective temperature-range of any particular element; and since this resistance R should preferably lie well within the range of from 5 ohms to 1,000,000 ohms; and since the form-factor FF of the element should preferably lie within the range of 0.01 to 0.5, approximately—it follows that a desirable minimum resistivity $\rho_{min}$ of any high-temperature thermistor-material, at the highest temperature to which it will be called upon to respond, should be considerably above $$0.01\times5=0.05$$

ohms per centimeter-cube; and that a desirable maximum resistivity $\rho_{max}$ of any low-temperature thermistor-material, at its lowest temperature, should be considerably below $0.5\times10^6=500{,}000$ ohms per centimeter-cube.

The resistivity of 100% or pure sintered chromic oxide, when made in accordance with my preferred process, as subsequently described, varies between 180,000 ohm-cm. at 50° C., and 3.8 ohm-cm. at 1000° C., (these resistivity-values being only approximate). Some thermistors may be required to respond to still lower temperatures, as low as −100° C., while others may be required to respond to still higher temperatures, as high as 1100° C., or even 1200° C. For thermistors having the lowest temperature-ranges, and a form-factor within the preferred range, it is therefore necessary to find a thermistor-composition having a resistivity which is considerably lower than that of pure sintered chromic oxide; whereas, for thermistors having the highest temperature-ranges, and a form-factor within the preferred range, it is necessary, or at least desirable, to find a thermistor-composition having a resistivity which is higher than that of pure sintered chromic oxide, in order to keep away from the resistances at which accurate measurement or responsiveness becomes too difficult. These materials, of either depressed or elevated resistivities, are obtained by using certain sintered oxide-mixtures, of which chromic oxide is the principal constituent, as will be subsequently explained.

I have discovered that there are certain manufacturing-precautions or steps which are necessary, or at least highly desirable, if thermistors are to be produced, having the requisite or desirable mechanical strength, uniformity of structure, stability of performance, and reproducibility under reasonable manufacturing-conditions.

In making a thermistor-element or other heat-resistant composition-body in accordance with my preferred process, I first screen the powdered semiconductor-material through a suitable screen such as a 100-mesh screen. If there are a plurality of powders of different substances to be mixed, these are first thoroughly mixed in the desired proportions, in the dry state, preferably using powders of the same mesh (although this may not be necessary), but taking care that the mixing is very thorough.

It is necessary to add an adhesive-agent to the dry powder, for holding the particles together when they are subsequently pressed, cold, into the form of a green or unfired patty or molded cake, as will be subsequently described, so that the latter can be handled, prior to the sintering operation, and to produce a compact, uniform-textured sintered product. It is further necessary that this adhesive-agent should not be present in the final product, as it would be subject to chemical change at the operating-temperatures of the thermistor-element, besides interfering with the conductivity-phenomena in the sintered semiconductor-particles. I therefore use a heat-dissociable adhesive-agent, preferably fish oil, or one of the plasticisers or plastics.

It is also necessary to add a deflocculating or dispersion-agent to the powder, for putting the separate powder-particles and adhesive-particles into suspension, so that they will not form into non-homogeneous masses prior to or during the molding-process, subsequently described. It is further necessary that this deflocculating agent should not be present in the final product, as it would be subject to drying or to dissociation or change, so that a stable product could not be obtained. I therefore use a volatile deflocculating agent, preferably turpentine substitute, which is a petroleum distillate intermediate between gasoline and kerosene.

If only a very small percentage of a certain metal-oxide is to be mixed with the chromic-oxide powder, this may be done by dissolving the nitrate of that metal, (or other soluble salt which reduces to the oxide on heating), with the adhesive agent or the deflocculating agent, or both, and mixing it with the chromic-oxide powder in that way, thus obtaining a very fine, even distribution of the added oxide, with a means for obtaining a very accurate quantitative control.

In general, when I refer to metal oxides as raw ingredients, which are subsequently to be heated to sintering temperatures, I mean to include equivalent amounts of other salts of the specified metal, which will reduce to the specified quantity of the oxide, on heating.

Preferably, 5 percent of fish oil is first dissolved or mixed in or with the turpentine substitute, and this solution or mixture is added to the dry semiconductor-powder or powder-mix, in the proportions of a few drops per cc. of the powder. The resulting wet mixture is then thoroughly mixed or stirred, soon becoming a heavy viscous paste, because a large part of the turpentine substitute (or other solvent) evaporates very quickly. This mixing or stirring is then continued until the heavy paste becomes a fairly-well-dried-out slip.

The next step is to press, form or mold this slip into a still-further-dried-out, coherent, shape-holding cake or mass of a predetermined shape, preferably in the form of a cake which may be a strip having approximately the thin thickness which is desired of the finished thermistor element, so that, when the cake or strip is subsequently fired at a sintering-temperature (as will be described) it will have the desired thickness. Usually, this cake-forming step is divided into a drying-step, consisting of drying the slip overnight, or in a 100° C. oven for a few minutes, crushing and sifting, followed by a molding or forming-step, which forms the thin cake or strip. The molding or forming-step is preferably done by pressing the mass in a mold at a suitable pressure such as 2000 pounds per square inch, or it may be done by slip-casting. Slip-casting commonly uses water as a carrier, and includes either extruding a fairly stiff slip or green (unfired) mixture, or pouring a slurry (or slip at a wetter constituency) over plaster of Paris, which absorbs the moisture quickly.

The next step is a prefiring-step, whereby the formed masses or cakes are flash-fired in a large tube furnace which reaches 1000° C. in less than an hour, if the mass is only 1 or 2 mm. thick, and then it is allowed to cool. For thicker masses, however, this prefiring heating must be brought about much more slowly, so as to come up to the 1000° temperature in sometimes much more than an hour. If bismuth oxide is present, this flash-firing temperature should not be greater than 600° C., so as not to drive off the bismuth oxide. This flash-firing step gives the fish oil (or other adhesive-agent) time to be thoroughly driven off, as well as any remaining traces of the solvent or deflocculating agent. This is necessary in order to prevent the cakes from exploding as they would do if they were fired at their sintering-temperature while containing any volatile or heat-dissociable materials.

The final step in forming the sintered composition is to fire the prefired cakes in a clean muffle kiln or other furnace of non-volatile refractory material, at a sintering-temperature, preferably 1500° C., with the cakes resting on zircon-sanded silica-brick, the sintering-temperature being held for four hours or other suitable "soaking" time, or until a well-sintered body of reproducible characteristics is obtained. The lowest practicable sintering-temperature for chromic oxide composition-blocks is 1450° C., but a temperature of 1500° C., or not much more than that, gives better results. When bismuth trioxide, $Bi_2O_3$, is used as a recrystallizer, as will be subsequently explained, the furnace must be brought up quickly to its sintering-temperature, so that the bismuth trioxide will not have time to volatilize off completely before the attainment of the temperature necessary for sintering the chromic oxide; as otherwise the bismuth trioxide would not perform its function of consolidating the sintered product. The sintering-temperature must be considerably less than 1900° C., in order to avoid difficulties due to the volatilization of the chromic oxide or other oxide-constituent of the sintered body.

After the sintering operation, if the sintered strips or cakes are not already the right size, they must be sawed or ground and polished to size, preferably in the form of long thin strips as previously described, although I am not limited to any type of shape or form-factor.

It is necessary, now, to apply two metal terminals 2 to the respective ends of each fired strip 1, as shown in Fig. 1, in order that the strip may be used as a thermistor-element. Heretofore, many different kinds of terminals have been tried, with indifferent success.

According to my method, I prefer to apply the terminal-connections 2 to a sintered strip 1 by first coating each end of the strip with a small quantity of large-granule noble-metal paste, such as platinum-paste, covered by a noble-metal foil, such as platinum-foil of 1 or 2 mils thickness, which is thin enough not to tear away from the finished product because of differences in thermal expansion. The platinum-paste is a mixture of powdered platinum in a volatile or heat-dissociable binding-paste or liquid. The strip is then again prefired slowly, at a temperature suitable for drying out the paste, and finally again finish-fired at a higher temperature which is suitable for completing the bond between the platinum terminal and the composition-body, this finish-firing temperature being 1200° C. Quite often, a coating of platinum-paste is first applied, without the foil, and fired on, and then a second coating of platinum-paste is applied, with the foil added, and fired to make the finished terminal. While I have described the terminal-coatings as being of platinum, they could be of other high-melting-point noble metals, such as osmium, rhodium, iridium, and others, defining a noble metal as a metal whose oxide is not stable, and defining high-melting-point here as having a melting-point in excess of 1100 or 1200° C.

It is an essential feature of my invention, so far as the art of thermistors is concerned, that the sintered composition-body shall either be composed substantially entirely of chromic oxide, $Cr_2O_3$, or shall be composed of a sintered mixture of selected metal-oxides of which chromic oxide comprises at least as much as 50%.

In many cases, a better sintering action is obtained, resulting in a product which is stronger, more compact, and more uniform in texture, if a suitable fluxing or recrystallizing or shrinking agent is mixed with the powder to be sintered. When that powder consists either wholly or principally of chromic oxide, as is the case in my present invention, the only practically suitable agent which I have discovered for this fluxing purpose is bismuth trioxide, $Bi_2O_3$, which may be mixed with the dry chromic-oxide powder or powder-mixture, in proportions from 1 to 5 or 10% by weight, usually about 5%. In the subsequent heating-process, the bismuth trioxide is apparently entirely driven off, so that it does not appear as a constituent of the finished thermistor-element, but before it is driven off, it apparently serves to recrystallize the chromic-oxide, repairing the crystals which were broken or damaged in the grinding-process which was used to pulverize the chromic oxide to make a powder, and shrinking the product into a more compact mass. The bismuth trioxide thus generally does not greatly alter the electrical properties of the resulting thermistor-element, but it frequently makes elements which are better and more uniform in their physical structure, and which are more successfully reproducible. This bismuth trioxide may be added to the initial ingredients of either a 100% chromic-oxide thermistor or a thermistor which is composed (in the final product) of at least 50% of chromic oxide, plus some other suitable metal oxide or oxides.

Figure 5:
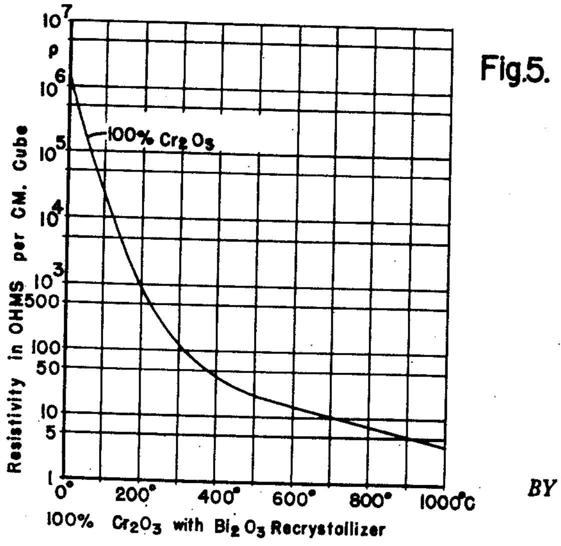
Fig. 5 is an approximate resistivity-temperature curve for a sintered 100% chromic-oxide thermistor, made in accordance with my invention.

The resistivity-temperature characteristic of a 100% sintered chromic-oxide thermistor, made in accordance with my invention, (preferably using 5 parts, by weight, of bismuth trioxide mixed with 100 parts of chromic-oxide powder, in the original ingredients), is approximately shown in Fig. 5, in which the common logarithm of the resistivity, in cm.-ohms or ohms per centimeter-cube, is plotted against the temperature in degrees centigrade. This figure clearly shows the very great change in the resistivity of a properly prepared, sintered, chromic-oxide thermistor, at different temperatures ranging from 0° C. to 1000° C., and the curve could be extrapolated, if desired, for a certain distance above and below the temperature-limits indicated on the diagram. Thermistors having reasonably good reproducibility, or conformity to the same resistivity-curve, similar to that which is shown in Fig. 5, are obtainable with my invention.

Of the various metal-oxide diluents which may be used with chromic oxide to form a sintered thermistor, the only satisfactory activator (or ingredient for reducing the resistivity of the thermistor) is nickel monoxide, NiO. Again, it is desirable to add 5% of $Bi_2O_3$ to the raw materials, making 105% of the dry mixed metal-oxide powders. The nickel-monoxide powder may be added in various percentages of the total weight of chromic oxide and nickel monoxide combined, but the preferred range is between 1%, or possibly ½%, and 4% or possibly up to 7%. The resistivity-temperature characteristic of a typical sintered thermistor, having 2% nickel monoxide and the balance chromic oxide, with a bismuth-trioxide recrystallizer, is approximately shown in Fig. 6*a*, which is plotted to the same resistivity-scale as Fig. 5. The resistivity-percentage characteristics of sintered thermistors, composed of various percentages of nickel monoxide, the balance chromic oxide, with bismuth trioxide added, are plotted approximately in Fig. 6*b*, where the common logarithm of the resistivity is plotted, to the same scale as in Figs. 5 and 6*a*, against the percentage of nickel monoxide, while the temperature is held constant, two curves being plotted for two different temperatures as indicated in Fig. 6*b*.

Figure 6A:
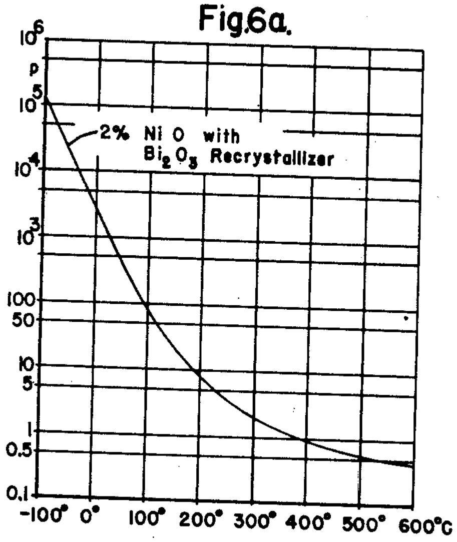
Figure 6B:
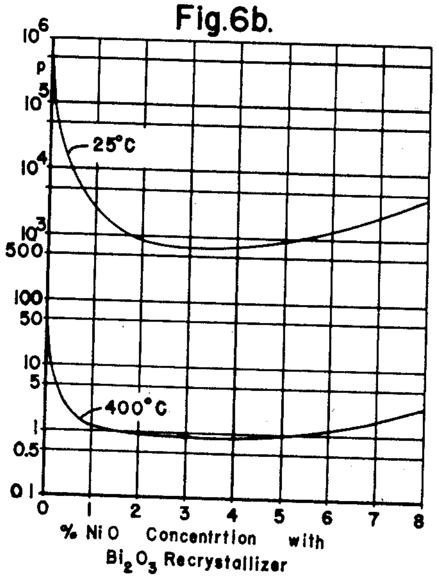

It will be noted, from Fig. 6*b*, that the effectiveness of nickel monoxide as an activator (or resistivity-depressor) is a maximum at around 4 or 5 percent, or between 1 and 7 percent. In these percentages of nickel monoxide, not only does the thermistor have approximately a minimum resistivity, but it also has the least sensitivity to slight variations in the nickel-monoxide content, thereby minimizing the resistivity-changing effects of discrepancies due to volatilization in the sintering-furnace, or due to imperfect homogeneity in the mixture, thus making it easier to maintain reproducible uniformity of resistivity-characteristics in successive batches of the thermistor-mix.

The typical chromic oxide and nickel monoxide thermistor of Fig. 6*a* has a preferred temperature-range from −100° C. to 300 or 350° C., and in this range its properties are fairly (though not perfectly) reproducible, retraceable and non-drifting. Such good results as are obtained are all the more remarkable because nickel monoxide, by itself, is not stable at temperatures in the range somewhere between 400 and 600° C., where it vacillates in oxygen-content between nickel monoxide, NiO, and nickel sesquioxide, $Ni_2O_3$. For this reason, it is desirable to use nickel monoxide in the smallest feasible percentages, preferably in the range between 2 and 4 percent. Since these elements are fired at 1500° C., I believe that thermistors composed of chromic oxide and nickel monoxide will have greater stability, particularly if they are to be operated in the higher temperature-ranges between 350° C. and 450 or 500° C., if they are given a preliminary "soaking" run for, say, fifty hours at 450° C., or some other temperature between 400° C. (or slightly less) and 500° C.

Of the various metal-oxide diluents which may be used with chromic oxide to form a sintered thermistor, one of the most satisfactory poisoning agents (or ingredients for increasing the resistivity of the thermistor) is cobaltic oxide, $Co_2O_3$, or probably cobaltous oxide, CoO, as the former probably reduces to the latter during the process of firing. My own experiments have been with cobaltic oxide, but I believe that corresponding weights of cobaltous oxide could be substituted, giving the same cobalt-content, that is, 2×74.94/165.88, or 90% as much cobaltous oxide as cobaltic oxide. The resistivity-changing effect of cobalt-oxide additions to chromic oxide, at very small percentages of cobalt oxide, is somewhat smaller than at higher concentrations, and it has a maximum cusp in the neighborhood of ½%, and a minimum cusp in the neighborhood of 1%; but when the concentration of cobaltic oxide is increased to somewhere in the range between 2 and 14% (or between 2 and 13% of cobaltous oxide), the sensitivity of the thermistor to the $Co_2O_3$ concentration is rather small, as shown by the flatness of the curves in Fig. 7*a*. The three flat-curve regions are the preferred concentrations, that is, in the neighborhood of ½%, in the neighborhood of 1%, and between 2 and 14% of cobaltic oxide.

Very excellent sintered thermistors are obtained with $Co_2O_3$ as a diluent. These thermistors have higher resistivities than pure sintered chronic oxide, they have very good reproducibility, and they are useful in the temperature-responsive range between 300° C. (or even lower) and 1100 to 1200° C. The resistivity-temperature characteristics of two typical sintered thermistors, respectively having ½% and 4% cobaltic oxide (corresponding to 0.45% and 3.6% cobaltous oxide) and the balance chromic oxide, are approximately shown in Fig. 7*a*, which is plotted to the same resistivity-scale as Figs. 5 and 6*a*.

Figure 7A:
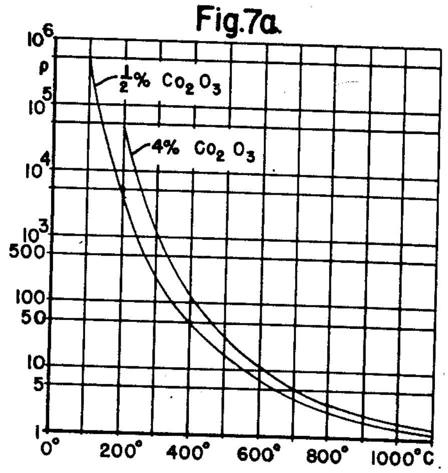
Figure 7B:
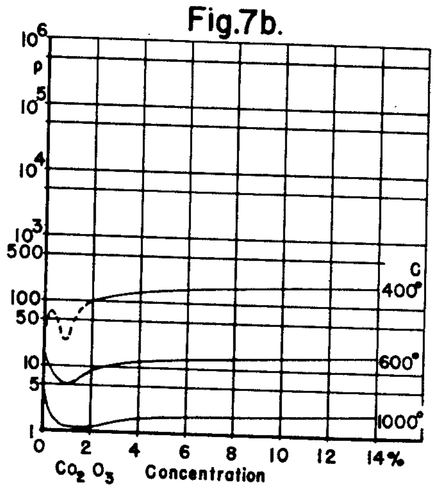

The resistivity-percentage characteristics of sintered thermistors, composed of various percentages of cobaltic oxide, the balance chromic oxide, are plotted approximately in Fig. 7*b*, where the common logarithm of the resistivity is plotted to the same scale as previously, against the percentage of cobaltic oxide, while the temperature is held constant, three curves being plotted for three different temperatures as indicated in Fig. 7*b*. It will be noted from Fig. 7*b*, that the effectiveness of cobaltic oxide as a poison (or resistivity-elevator) is steadily, but only slowly, increasing, throughout the third preferred concentration-range of from 2 to 14%, and even at higher concentrations. However, at the higher concentrations, the performance becomes erratic, so that less than 14% is much to be preferred.

The flatness of the resistivity-concentration curves, in the upper preferred percentage-range of 2 to 14% of cobaltic oxide, in Fig. 7*b*, again shows that the thermistor is not very sensitive to slight variations in the cobalt-oxide content, thereby minimizing the resistivity-changing effects of drifts, or changes during use, in the percentage-composition of the thermistor-element, as a result of selective volatilization of the different oxides when the element is used at high temperatures of the order of 1000° C., more or less, besides having the same advantages respecting the sintering and mixing processes, as pointed out in connection with the preferred range of nickel-oxide concentration in Fig. 6*b*.

Other less satisfactory diluents for sintered chromic oxide include oxides of barium, iron, thorium, titanium (either with or without the admixture of calcium oxide), tungsten, vanadium and zirconium.

Figures 8A, 8B:
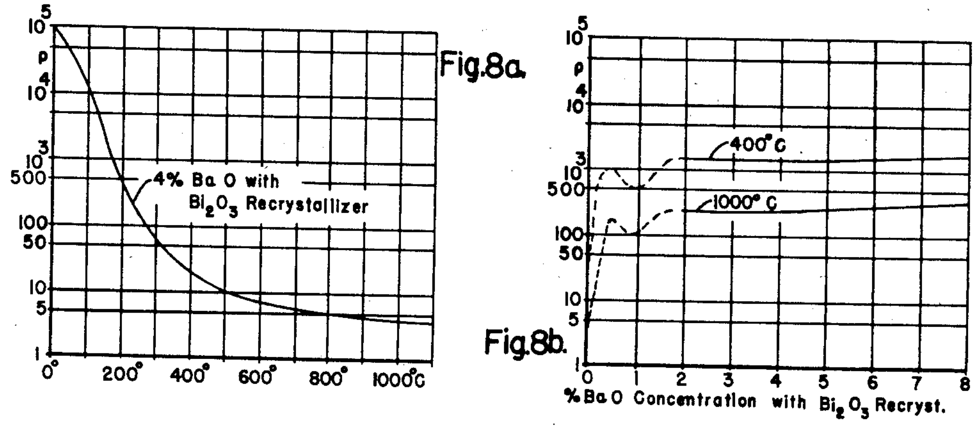

Barium oxide, BaO, may be used, with fairly satisfactory results, in amounts up to 8%, as a diluent for sintered chromic oxide, preferably always with an additional 5% of bismuth trioxide for a shrinking agent, making a total of 105% of the raw oxide mixture. With more than 8% of barium oxide, the elements become too soft for fabrication. The resistivities of sintered thermistors of chromic oxide and from 0 to 8% of barium oxide are not greatly different from the resistivity of pure sintered chromic oxide. Fig. 8*a* shows the approximate resistivity-temperature characteristic of a typical sintered thermistor having 4% barium oxide and the balance chromic oxide, with bismuth trioxide added; while Fig. 8*b* shows the approximate resistivity-percentage curves for various percentages of barium-oxide concentrations, with a bismuth-trioxide recrystallizer, at two different temperatures, these curves being drawn to the same resistivity-scale as the other resistivity-curves. In the interests of operating on the approximately horizontal part of the percentage-curve, as previously explained, barium-oxide concentrations of from 1 to 8 percent are preferable.

Ferric oxide, $Fe_2O_3$, used as a diluent for sintered chromic-oxide thermistors, produces elements with fair reproducibility and fair constancy. In concentrations around 32%, ferric oxide acts as a poison (resistivity-elevator) at the lower temperatures, such as 200 to 400° C., and as an activator (resistivity-depressor) at high temperatures, such as 1000° C. If a wide range of temperature-response is the objective, this effect of the ferric-oxide diluent on sintered chromic-oxide thermistors is just the reverse of the desired form of modification of the resistivity-characteristic of pure sintered chromic oxide, which has a resistivity which is too high for many purposes at low temperatures, and too low for many purposes at high temperatures. However, if the objective is to respond very sensitively to very slight temperature-variations from a given norm, the steep resistivity-temperature curve of the ferric-oxide diluted thermistor is an advantage. In concentrations around 15%, or from about 6% to about 20%, ferric oxide acts as a poison only at the lower temperatures, with little effect on the resistivity of sintered chromic oxide at the higher temperatures.

Figures 9A, 9B:
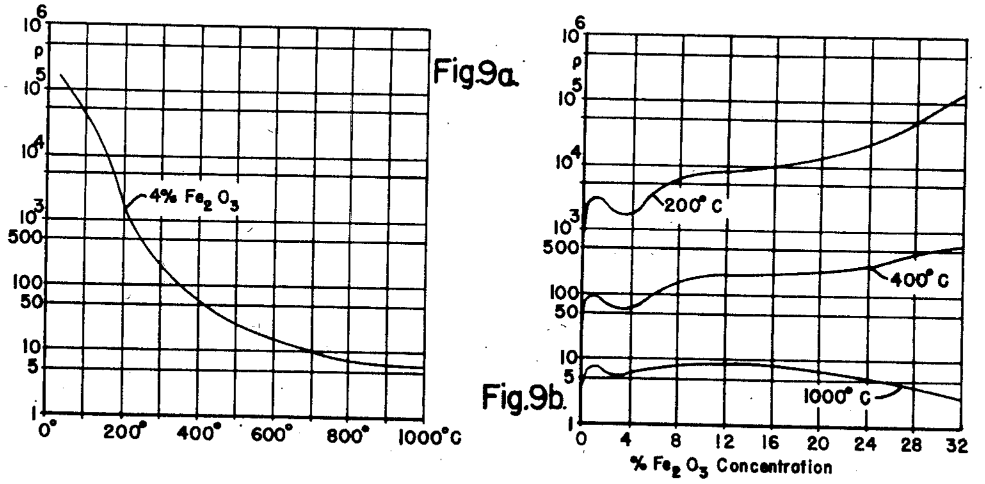

In lower concentrations, ferric oxide has little effect on the resistivity of sintered chromic oxide, having the levelest resistivity-percentage curves at ferric-oxide concentrations of from about 3% to about 5%, which would probably be the preferred concentrations in which ferric oxide would be used, for most applications of thermistors. Fig. 9a shows the approximate resistivity-temperature characteristic of a typical sintered thermistor having 4% ferric oxide and the balance chromic oxide; while Fig. 9*b* shows three approximate resistivity-percentage curves for various percentages of ferric-oxide concentrations, at three different temperatures, these curves having the same resistivity-scales as my other resistivity-curves.

Figures 10A, 10B:
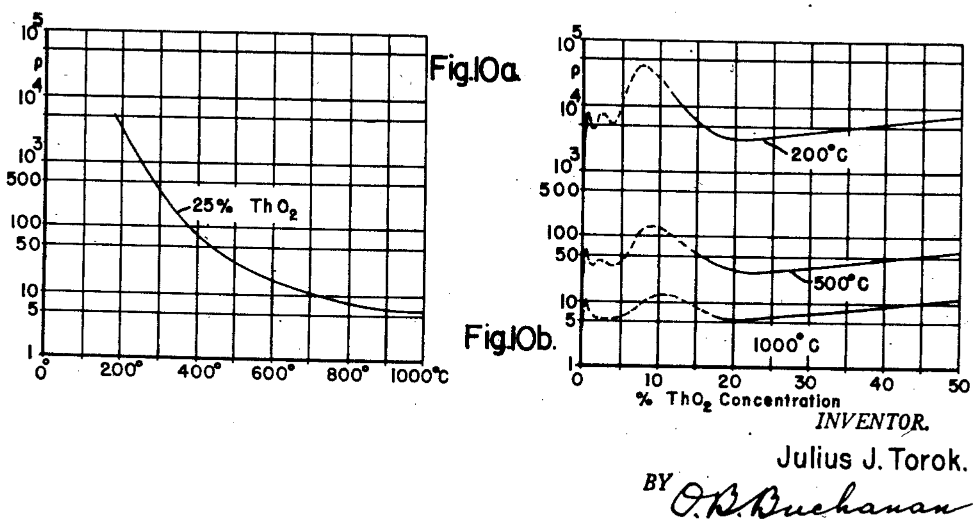

Thorium dioxide, $ThO_2$, when used as a diluent for sintered chromic oxide, produces a thermistor-element which is suitable for temperature-control only in the higher temperature-ranges. Fig. 10*a* shows the approximate resistivity-temperature characteristic of a typical sintered thermistor having 25% thorium dioxide and the balance chromic oxide; while Fig. 10*b* shows three approximate resistivity-percentage curves for various percentages of thorium-dioxide concentrations, at three different temperatures, using the same resistivity-scales as in the other resistivity-curves. The curves in Fig. 10*b* show that thorium dioxide acts as a poison (resistivity-elevator) for sintered chromic oxide, but not as strongly as cobalt oxide. If the results plotted in Fig. 10*b* are reliable, the most level portions of the resistivity-percentage curves are obtained in the range between about 15% and about 40 to 50% of thorium dioxide; but if the curve humps in the vicinity of 8% thorium dioxide are due to doubtful readings, as may be possible, the preferred level-curve percentage-range of thorium dioxide may take anywhere from 4% to 50%.

Figures 11A, 11B:
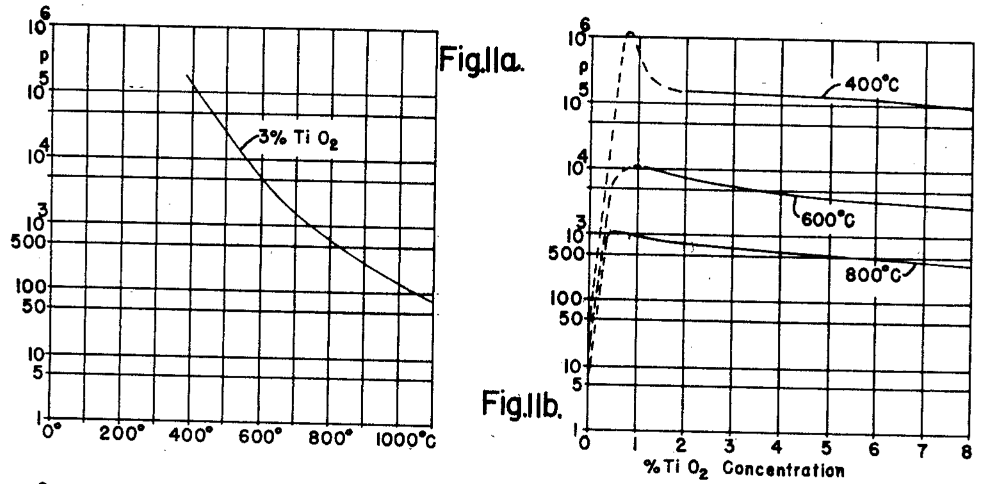

Titanium dioxide, $TiO_2$, acts as a poisoning (resistivity-increasing) agent for sintered chromic oxide, having its maximum effect in concentrations of somewhere around 1% of titanium dioxide, but being very sensitive to slight variations in concentration. The resulting thermistors are less stable than 100% sintered chromic oxide, this instability increasing with the titanium-dioxide concentration, especially at some point above 8%. Fig. 11*a* shows the approximate resistivity-temperature characteristic of a typical sintered thermistor having 3% titanium dioxide and the balance chromic oxide, while Fig. 11*b* shows three approximate resistivity-percentage curves for various percentages of titanium-dioxide concentrations, at three different temperatures, using the same resistivity-scales as in the other resistivity-curves. Perhaps the preferred concentration-range for titanium dioxide, as a diluent for sintered chromic oxide, is from ½% to 8%, probably more accurately specified as being between the limits of about 2% and about 5%.

In all cases, more than one diluent may be added to sintered chromic oxide. This may be exemplified in the case of the titanium-dioxide diluent, which may be replaced by a mixture of titanium dioxide and calcium oxide, CaO, in any desired proportions such as 0.25 times as much calcium oxide as titanium dioxide, or 0.45 times as much calcium carbonate, $CaCO_3$, as titanium dioxide. When calcium carbonate is used as the raw material, instead of calcium oxide, it gives off carbon dioxide and reduces to calcium oxide during the heating which is incident to the sintering process. Carbonates are only one of many salts which can be used to yield oxides in the final product. All such salts should be counted as being the equivalents of oxides, and should be figured in accordance with the amount of oxide which they will contribute to the final product.

Figures 12A, 12B:
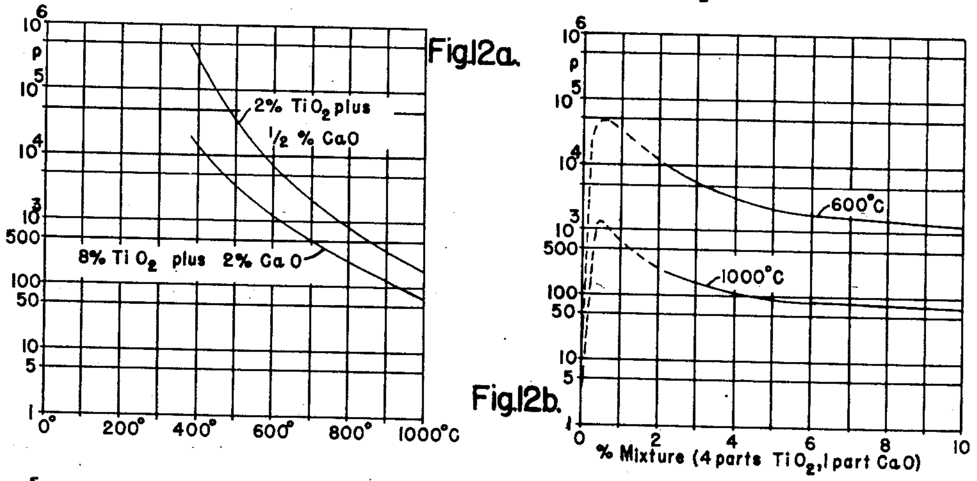

Fig. 12*a* shows the approximate resistivity-temperature characteristic of two typical sintered thermistors, one having 2% titanium dioxide, ½% calcium oxide, and the balance chromic oxide, and the other having 8% titanium dioxide, 2% calcium oxide, and the balance chromic oxide. (The original raw mixes actually contained 97½% chromic oxide, 2% titanium dioxide, and 0.9% calcium carbonate, and 90% chromic oxide, 8% titanium dioxide, and 3.6% calcium carbonate, respectively, the calcium carbonate reducing to calcium oxide in firing.) Fig. 12*b* shows two approximate resistivity-percentage curves, plotted in terms of the percentage of the mixture of 4 parts titanium dioxide and 1 part calcium oxide, at two different temperatures. (In all curves in which resistivity is shown, the resistivities are plotted to the same scale, so that direct visual comparison may be made, from one curve to another.)

The effect of adding calcium oxide to the titanium-dioxide diluent, at an intermediate thermistor-temperature of 600° C., is to increase the resistivity of the sintered mixture, at titanium-dioxide concentrations of from 2% to about 3⅓% (or titanium-dioxide and calcium-oxide concentrations from 2.5% to about 4.15%), as compared to sintered mixtures having the same amounts of titanium dioxide without any calcium oxide. At greater concentrations, that is, between about 3⅓% and 8% of titanium dioxide (or between about 4.15% and 10% of the mixture of 4 parts titanium dioxide and 1 part calcium oxide), the effect of the calcium-oxide addition is to decrease the resistivity of the sintered mixture below what it would have been with the same amount of titanium dioxide without any calcium oxide, at said 600° C. Thus, a mixture of titanium dioxide and calcium dioxide diluents is more sensitive to variations in the diluent-concentration than titanium dioxide alone, as a diluent for sintered chromic oxide, thus necessitating greater care in weighing the initial ingredients and in very thoroughly mixing them, when using 1 part of calcium oxide to every 4 parts of titanium dioxide. However, sintered thermistors using the two diluents are very stable, and quite accurately reproducible, probably being superior to sintered thermistors using titanium-dioxide alone as the diluent.

My researches have not covered the range of the two diluents (4 parts titanium dioxide and 1 part calcium oxide), in concentrations less than 2.5% of the mixed diluents, or in concentrations more than 10% and up to the precise point at which the composition melted in the 1500° C. furnace. However, in concentrations less than 2.5% of the two mixed diluents, I would expect the resistivity to rise to a peak at somewhere around 0.5% of the mixed diluents, based upon the analogy of the effect of varying concentrations of titanium dioxide alone. At some not exactly determined concentration of the two mixed diluents, somewhere above 10%, the composition melts in the furnace, unless the sintering temperature should be reduced below the generally preferred temperature which is 1500° C. In the interests of avoiding this melting-difficulty, and obtaining the flattest possible resistivity-percentage curve, I believe that the preferred concentration-range is from about 5% to not much more than 10% of the mixture of the two diluents in the proportions of ¼ part of calcium oxide for each part of titanium dioxide, although smaller concentrations may be used.

Figures 13A, 13B:
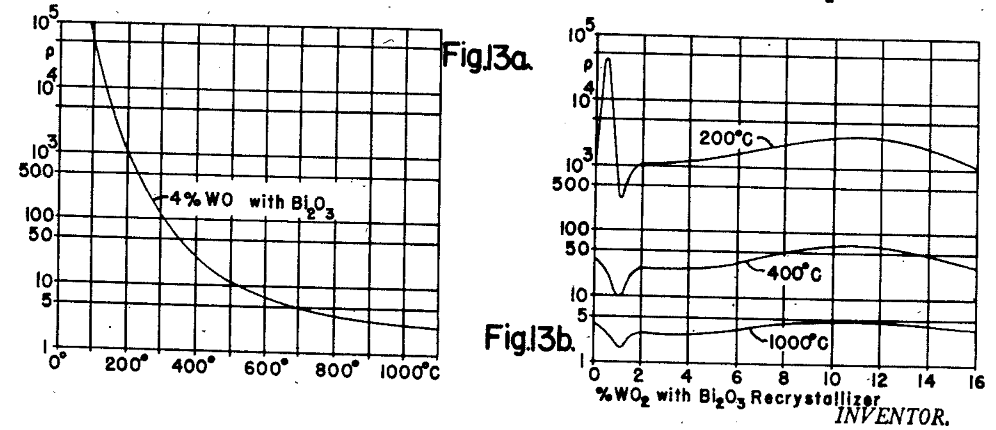

Tungsten dioxide, $WO_2$, as a diluent for sintered chromic-oxide thermistors, preferably with 5% of bismuth-trioxide fluxing-agent, produces fairly good thermistors, with approximately the same resistivity-characteristics as sintered 100% chromic oxide Low concentrations of tungsten dioxide, in the range between about ½% and about 4%, more or less, with the balance chromic oxide, produce very hard sintered thermistor-elements. Fig. 13*a* shows the approximate resistivity-temperature curve of a typical sintered thermistor having 4% tungsten dioxide, and 96% chromic oxide, with an additional 5% of bismuth trioxide in the cold mix; while Fig. 13*b* shows three approximate resistivity-percentage curves for sintered thermistors having different percentages of tungsten dioxide, with the balance chromic oxide, with an additional initial admixture of 5% of bismuth trioxide, plotted at three different temperatures; the resistivity-scale being the same as in the other resistivity-curves. Any percentage of tungsten dioxide, from zero up to 16%, and probably more, may be used as a diluent for sintered chromic oxide.

It is quite probable that tungsten dioxide, $WO_2$, oxidizes to tungsten trioxide, $WO_3$, in the sintering furnace, and I believe that proportionate parts of tungsten trioxide could be used, yielding as much tungsten as tungsten dioxide, or 231.92/215.92=1.07 times as much tungsten trioxide as tungsten dioxide.

Figures 14A, 14B, 15A, 15B, 16A, 16B:
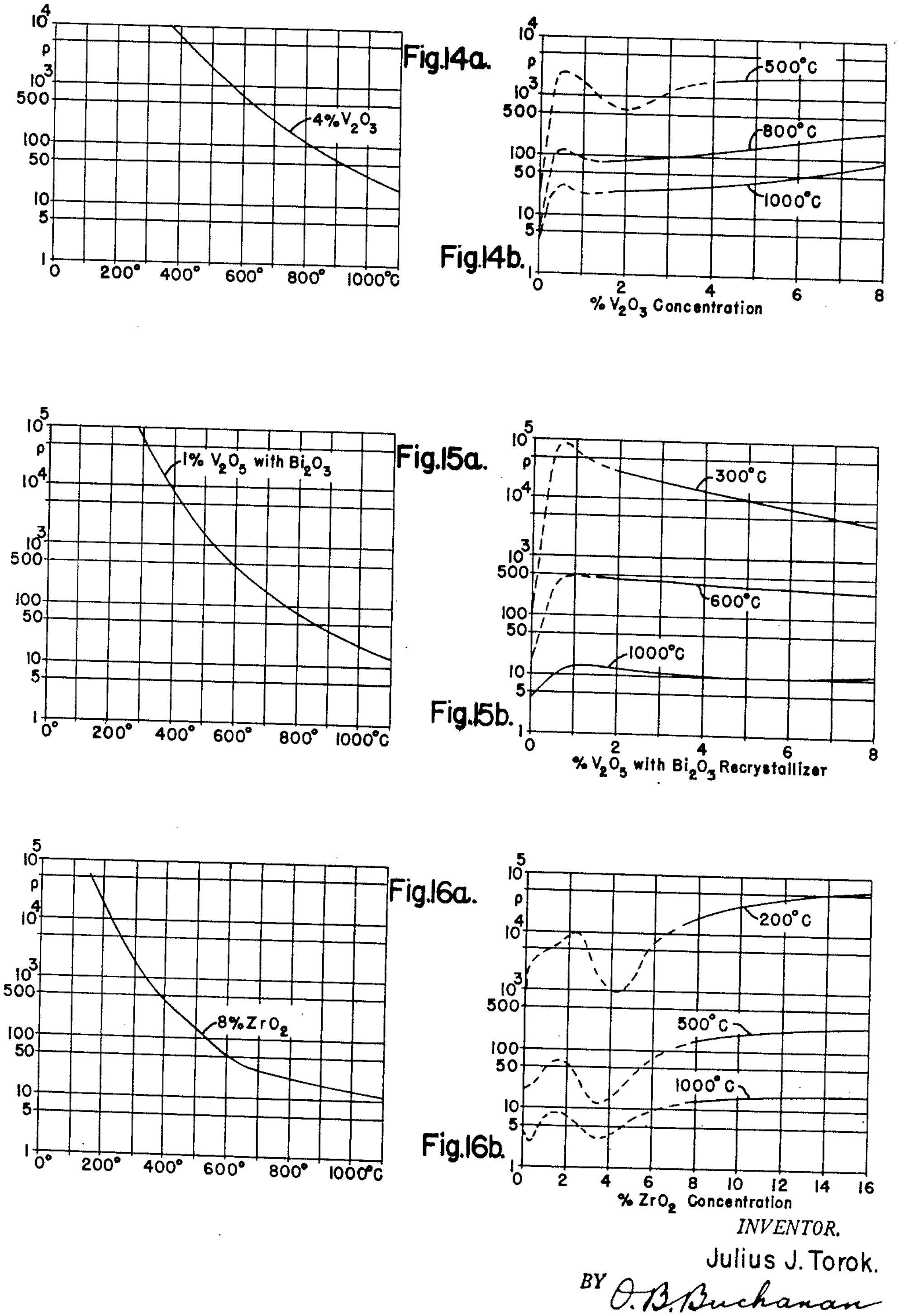

Vanadium trioxide, $V_2O_3$, can be used, in small percentages, as a diluent for sintered chromic oxide, but the effect of this diluent on the resistivity is not great, and the stability and reproducibility both suffer if the concentration of the diluent is increased above about 4%. At some point above an 8% concentration of this diluent, the resulting product melted in the firing furnace. Fig. 14*a* shows the approximate resistivity-temperature curve of a typical sintered thermistor having 4% vanadium trioxide and the balance chromic oxide, while Fig. 14*b* shows three approximate resistivity-percentage curves for sintered thermistors having different percentages of vanadium trioxide, with the balance chromic oxide, plotted at three different temperatures, the same scale being used for resistivity as in all of the other resistivity-curves. Perhaps any concentration between about ½% and not much more than 8% of vanadium trioxide, with the balance sintered chromic oxide, may be regarded as being in a preferred or acceptable range.

Small percentages of vanadium pentoxide, $V_2O_5$, either with or without the addition of 4 or 5% of bismuth trioxide, operated in a manner somewhat similar to vanadium trioxide, as a diluent for sintered chromic oxide, except that melting in the firing furnace does not occur until the vanadium-pentoxide concentration reaches somewhere between 16 and 32%, and the 16% concentration yields an element which is too brittle for use. Fig. 15*a* shows the approximate resistivity-temperature curve of a typical sintered thermistor having 1% vanadium pentoxide and the balance chromic oxide, with 5% of bismuth trioxide added to the original mixture. The steep slope of the resistivity-temperature curve offers the possibility of a closer temperature-control or temperature-response in the range between 500° and 1000° C. Fig. 15*b* shows three approximate resistivity-percentage curves for sintered thermistors having different percentages of vanadium pentoxide, with the balance chromic oxide, using the bismuth trioxide recrystallizer, plotted at three different temperatures, the same scale being used for resistivity as in all of the other resistivity-curves. Perhaps any concentration between about ½% and not much more than 8% of vanadium pentoxide, with the balance sintered chromic oxide, may be regarded as being in a preferred or acceptable range.

Zirconium dioxide, $ZrO_2$, may also be used as a diluent for sintered chromic oxide, with decreasing stability of the product as the diluent-concentration increases, as is characteristic of substantially all diluents for sintered chromic oxide. Fig. 16*a* shows the approximate resistivity-temperature curve of a typical sintered thermistor having 8% zirconium dioxide and the balance chromic oxide, while Fig. 16*b* shows three approximate resistivity-percentage curves for sintered thermistors having different percentages of zirconium dioxide, with the balance chromic oxide, plotted at three different temperatures, the same scale being used for resistivity as in all of the other resistivity-curves. Perhaps any concentration between about ½% and not much more than 16% of zirconium dioxide, with the balance sintered chromic oxide, may be regarded as being in a preferred or acceptable range.

In most of the foregoing examples of diluents for sintered chromic-oxide thermistors, I have excluded very low percentages of the diluent from the preferred concentration-range, because the resistivity-changing effects were either small, or undesirably sensitive to small changes in the concentration of the diluent. In most cases, small diluent-concentrations, of less than ½%, or even somewhat larger percentages, may be regarded as unimportant, because such small concentrations may sometimes be quite critical in their effects on the resistivity, so as to be hard to control commercially, though still usable; while in other cases such small concentrations of the diluent may have scarcely any effect on the resistivity and may therefore be regarded either as being unnecessary or as being the substantial equivalent of a thermistor made with "substantially" pure sintered chromic oxide.

I have tried a number of other metal oxides as small-percentage diluents for sintered chromic-oxide thermistors, including aluminum oxide ($Al_2O_3$), antimony trioxide ($Sb_2O_3$), beryllium oxide (BeO), calcium oxide (CaO), ceric oxide ($CeO_2$), lead monoxide (PbO), magnesium oxide (MgO), manganous oxide (MnO), uranium dioxide ($UO_2$), and zinc oxide (ZnO), sometimes used alone as a diluent, and sometimes used with the addition of a bismuth-trioxide fluxing agent, and the resulting sintered products are variously describable (in comparison with my more preferred thermistors) as being erratic, generally unsatisfactory, only fair, unsuitable, useles, unstable, non-repeatable, or having poor reproducibility, in various degrees.

Of these less desirable diluents for sintered chromic oxide, perhaps calcium oxide deserves more study, either alone, or combined with other diluents, or fluxing agents, or with different manufacturing-processes, including such variations as different mixing steps, cake-pressing steps, firing temperatures, soaking temperatures, or the like, to see if a stable, reproducible sintered chromic-oxide thermistor cannot be made with this diluent, as it is one of the few available activators or resistivity-reducing agents for sintered chromic oxide. I have already indicated how calcium oxide may be combined with titanium dioxide to obtain a satisfactory diluent for sintered chromic oxide. Undoubtedly it could also be combined with still other diluents. The combination of nickel monoxide or nickel sesquioxide with a small percentage of calcium oxide ought to be tried as a diluent for sintered chromic oxide, with some promise of obtaining a thermistor-element having a reduced resistivity.

With the possible exception of nickel monoxide, tungsten dioxide, and vanadium pentoxide, all of my preferred diluents for sintered chromic oxide are stable, high-melting-point metal-oxides, having melting points higher than 1550° C. The nickel monoxide may change its oxide-composition somewhere in the vicinity of 400 to 600° C., more or less. The tungsten dioxide may change, in the firing furnace, by oxidizing to tungsten trioxide, which has a high melting point. The vanadium pentoxide may also change, in the firing furnace, by reducing to vanadium tetroxide, which has a high melting point. On the other hand, it is possible that these diluents, when intimately mixed in small percentages, with chromic oxide, are chemically stable as to oxygen-content, as well as being non-melting at the 1500° C. firing-temperature which I prefer.

With the exception of antimony trioxide and lead monoxide, which were not satisfactory diluents, all of the less satisfactory group of diluents which I have tried for sintered chromic-acid thermistors have also been stable, high-melting-point metal-oxides, all having melting points higher than 1550° C.

I believe that it is quite likely that some one or more of the other stable, high-melting-point metal-oxides, or even oxides having melting points as low as 1100° C., may be found to be desirable as low-percentage diluents for sintered chromic-oxide thermistors. Such oxides include cobaltous oxide (CoO), columbium pentoxide ($Cb_2O_5$), ferrosoferric oxide ($Fe_3O_4$), hafnium oxide ($HfO_2$), lanthanum sesquioxide ($La_2O_3$), manganese tetroxide ($Mn_3O_4$), neodymium oxide ($Nd_2O_3$), silicon dioxide ($SiO_2$), stannic oxide ($SnO_2$), strontium oxide (SrO), titanium sesquioxide ($Ti_2O_3$), tungsten trioxide ($WO_3$), vanadium tetroxide ($V_2O_4$), and yttrium oxide ($Y_2O_3$), to which should perhaps be added various refractory glasses, ceramics, fire-bricks and insulators, preferably those which are altogether or preponderately oxide-mixtures, and possibly some other rare metal-oxides which are not readily available. As previously intimated, some of these oxides may be produced by the reduction or oxidation of other oxides of the same metals which I have used.

The fact that some of these untried diluents, such as silicon dioxide, or various vitreous compounds thereof, are known to be unsatisfactory, alone, as thermistor-elements, does not preclude the possibility that they may be usable, in small percentages, as diluents for sintered chromic oxide. In fact, I believe that all possible diluents are inferior, when used alone, to sintered chromic oxide, as I believe that sintered chromic oxide is the best base-material for thermistors, particularly for thermistors which are to be stable at temperatures of 300° C. or higher.

In all cases where I have mentioned a single diluent, it is believed to be possible to add relatively small quantities of other diluents, whether these other diluents are other good diluents or bad diluents, as has been exemplified in the case of titanium dioxide and calcium oxide. Sometimes the effects of such admixtures will be neither notably good nor bad. At other times, some improvement may be expected, while at still other times the effect of the extra diluent will be definitely harmful. In naming my preferred diluents, therefore, I do not mean to exclude the possibility of adding small quantities of the oxides of other metals to the oxide of the metal which is preferred as a diluent.

While I have used the term "mixtures" in describing the preparation of the raw materials for my sintered chromic-oxide thermistors which include diluent oxides of other metals, it may be possible that chemical compounds or mixtures of chemical compounds may be produced in the firing furnace. I contemplate this possibility in my general references to sintered mixtures of metal-oxides. I have not found any notable instance of precise oxide-proportions which would indicate the significance of any particular chemical formula for the products resulting from the sintering of any of my thermistor-compositions.

The thermistor-elements 1 which have been made as hereinabove described, including their permanently bonded platinum terminals 2, may be mounted in any one of a number of different ways, either bare, that is, exposed to the air or other fluid of which the temperature is to be measured, or covered by a protective coating, or enclosed in a protective casing, either evacuated or gas-filled, as is well-known.

A simple form of single-element thermistor-mounting is shown in Fig. 2 by way of example. In this particular form of mounting, the element 1 is supported by two metal terminal-leads 3 and 4 which are small-diameter wires which, in spite of their small diameter, are still stiff enough to support the small mass of the element 1. Preferably, the leads 3 and 4 should be of a metal-alloy, such as Nichrome, having a low heat-conductivity, so as not to carry away too much heat from the thermistor-element. The ends of the leads 3 and 4 are connected to the respective platinum terminals 2 at the two ends of the element 1. The lead-ends 3 and 4, which support the element 1, stick out from one end of a double-bore porcelain tube 5, having two longitudinally extending bores 6 and 7 through which the two leads 3 and 4 extend, being kept separated by the bores. The ends of the leads may be bent at the places where they enter or emerge from the two ends of the porcelain tube 5, so as to keep the wires from either twisting in the bores or slipping longitudinally through the bores.

Figure 3:
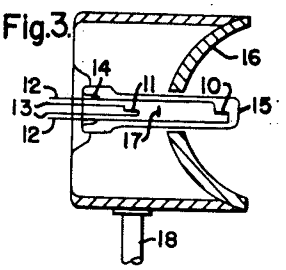
Fig. 3 is a longitudinal sectional diagrammatic view of a bolometer.

Sometimes a double-element thermistor-mounting is used, in which radiations are focused (as by a lens or a mirror) on one of the thermistor-elements, but not on the other, so that the assembly may be used for comparing the temperature of the radiation-responsive element with the temperature of the element which is responsive only to the ambient temperature. Such a mounting is called a bolometer. One of the many forms which it can take is diagrammatically indicated in Fig. 3, wherein it will be seen that the two elements 10 and 11 are mounted in spaced relation to each other, being supported by their respective lead-pairs 12 and 13 which pass through a suitable seal 14 or four-bore tube, or the like. If desired, the two elements 10 and 11 may be enclosed within a glass envelope 15 which is transparent to the radiations to be measured, and which may or may not be evacuated. A parabolic reflector 16, or other radiation-focusing means, is provided, with the foremost thermistor-element 10 at its focus, so that this element is heated by the radiations, while the rearmost element 11 is not. If desired, a shield 17 may be disposed between the two elements 10 and 11, to protect the rearmost element 11 from being affected by the radiations which impinge upon the reflector 16. Any suitable handle or supporting-member 18 is provided.

In using a thermistor to measure or respond to its temperature, it is necessary to pass an electric current therethrough, and to measure or respond to the voltage-drop caused by the flow of current through the thermistor. For best results, the amount of current-flow through the thermistor should be so small that the heating-effect of that current on the thermistor-element is negligible, compared to the temperature-changes to be detected. In my thermistors, the elements are extremely small physically, so that they will respond to radiations or temperature-changes quickly, without any appreciable time-lag, and they are capable of detecting, or discriminatively responding to, very small temperature-changes, both of which circumstances require that there shall be practically no heating-effect in the thermistor-element, due to the current which has to be sent through the element in order to measure or respond to its electrical resistance. This requires some sort of electronic circuit for determining or responding to the thermistor-resistance, which in turn varies rapidly with small changes in the thermistor-temperature.

Figure 4:
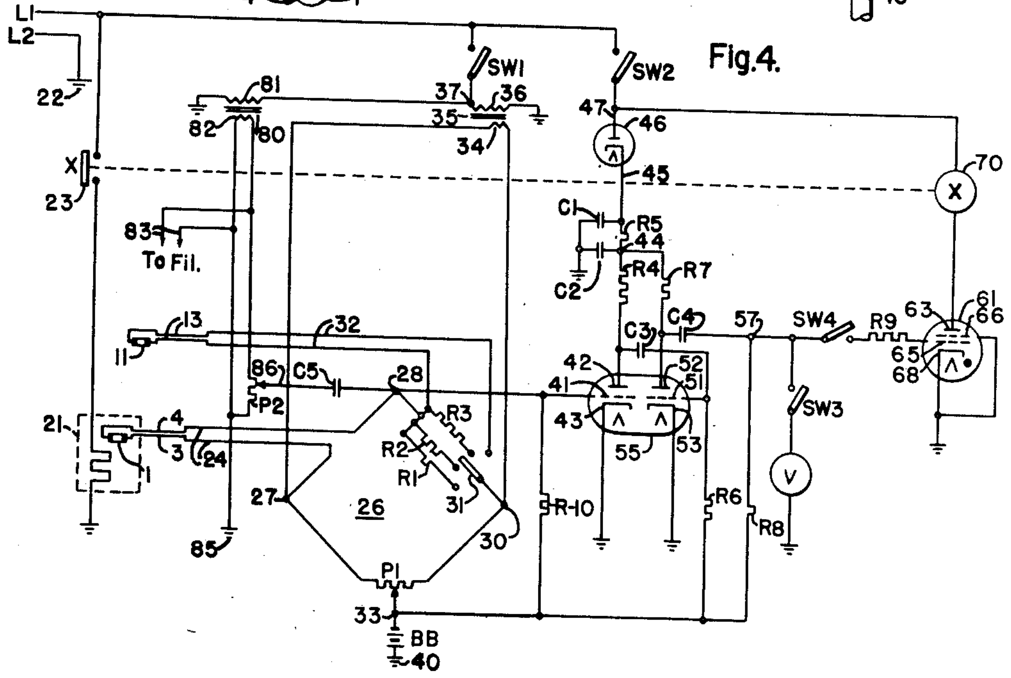
Fig. 4 is a wiring-diagram of circuits and apparatus embodying an electronic circuit for my thermistor.

Fig. 4 shows an improved form of electronic-circuit apparatus and control, for use with my thermistor. As shown in this figure, a single-phase, 110-volt, 60-cycle supply-circuit L1, L2 is indicated, by way of example, as energizing an electric furnace 21. The line L2 is grounded, as shown at 22, and the "hot" line L1 is connected to the furnace 21 through the normally open make-contact 23 of a relay or contactor X. A thermistor-element 1 is shown, extending into the furnace 21 to respond to the temperature thereof. The thermistor-leads 3 and 4 are connected, by a cable 24, to one arm of a bridge 26, between bridge-terminals 27 and 28. The next bridge-arm, between bridge-terminals 28 and 30, is provided with a 4-contact switch 31, whereby any one of four different resistors may be selected for this bridge-arm, these four resistors being, respectivly, a 100-ohm resistor R1, a 10,000-ohm resistor R2, a 1-megohm resistor R3, and a shielded or ambient-temperature bolometer-element 11, the leads 13 of which are connected to the bridge-circuit by means of a cable 32. These resistance-values, as are all of the other circuit-values in Fig. 4, are given only by way of illustration of one preferred exemplary form of embodiment, and not by way of limiting my invention to the particular circuit-constants which are used in this figure.

The third and fourth arms of the bridge 26 are provided by a 10,000-ohm potentiometer P1, which is connected between the bridge-terminals 27 and 30, and which is provided with an adjustable tap-point 33 which constitutes the fourth terminal of the bridge.

The bridge 26 may be energized with either alternating or direct current, the latter being in some respects more desirable, except that it is somewhat less simple and convenient. I have obtained good results with alternating-current energization, which is provided from a 6.3-volt secondary-winding 34 of a bridge-energizing transformer 35, having a primary winding 36 which is connected between a "hot" circuit 37 and ground. The "hot" circuit 37 is energized from the "hot" line L1 through a switch SW1. The secondary winding 34 of the bridge-energizing transformer 35 is connected to the bridge-terminals 27 and 30. Undesirable capacity-effects are avoided or minimized, in the bridge-energizing transformer 35, if the secondary winding 34 is disposed close the grounded end of the primary winding 36, as diagrammatically illustrated in Fig. 4.

The potentiometer bridge-terminal 33 is grounded at 40, through a 3-volt biasing-battery BB of the C-battery type. The opposite bridge-terminal 28 thus supplies the output-voltage or signal-voltage of the bridge, and it is connected to the grid 41 of a triode-amplifier having a plate or anode 42 and a cathode 43. The cathode 43 is grounded, and the anode 42 is energized, through a 100,000-ohm resistor R4, from a positive circuit 44, which is energized, through a 3,000-ohm filter-resistance R5, from the cathode-circuit 45 of a rectifier-tube 46, having an anode-circuit 47 which is energized from the alternating-current line L1 through a switch SW2. Each terminal of the filter-resistance R5 is grounded through a 20-microfarad filter-capacitor, as shown at C1 and C2. Any other rectifying means, and filtering-means, may be used, and in fact any other source of "B" battery voltage could be used for the positive circuit 44. When an alternating-current source and a rectifier is used to energize the positive circuit 44, any improvement in the filter R5, C1, C2 helps to improve the sensitivity of response to the output-voltage of the bridge 26.

The plate-voltage of the triode 41, 42, 43, is used as an amplified signal-voltage for a second triode-amplifier having a grid 51, a plate or anode 52, and a cathode 53. Thus, the plate 42 of the first amplifier is connected to the grid 51 of the second amplifier, through a .25-microfarad coupling-capacitor C3. The grid 51 of the second amplifier is preferably connected also to the bridge-terminal 33 through a 50,000-ohm biasing-resistor R6. The cathode 53 of the second amplifier is grounded, and the plate 52 is energized from the previously described positive circuit 44 through a 50,000-ohm resistor R7. The two amplifiers 41, 42, 43 and 51, 52, 53 may either be separate tubes, or they may be enclosed in a common evacuated envelope 55, making a double triode as shown.

The plate-voltage of the second triode 51, 52, 53 is used to energize a doubly amplified signal-circuit 57, through a .25-microfarad coupling-capacitor C4. This signal-circuit 57 is preferably also connected to the bridge-terminal 33 through a 10,000-ohm biasing-resistor R8.

Any desired signal-responsive means may be energized from this signal-circuit 57, which (in the illustrated case) has a twice-amplified voltage, responsive to any bridge-unbalance due to a resistant-change in the thermally responsive thermistor-element 1. This signal-responsive means may be used to indicate or to measure the furnace-temperature or the temperature of the element 1, or to record the same, or to automatically control the same. It may be used to measure, or to respond to, the amount of the off-balance output-voltage of the bridge, and hence the temperature-change which caused the off-balance condition; or it may be used to restore the bridge to a balanced condition, either by automatically controlling the temperature of the furnace, or by automatically readjusting the potentiometer tap-point 33 of the bridge so as to restore balanced bridge-conditions, meanwhile recording or indicating the amount of such adjustment, and hence recording or indicating the temperature-change which made such adjustment necessary.

Two illustrative signal-responsive means are shown in connection with the signal-circuit 57 of Fig. 4. One is a voltmeter V, which is connected between the signal-circuit 57 and ground, through a switch SW3. This voltmeter may be calibrated, of course, directly in degrees Fahrenheit or centigrade, or several scales may be provided, for the several different bridge-arm resistors which are selectable by the four-point switch 31.

The other signal-responsive means which is shown, by way of example, in Fig. 4, uses a gas-filled grid-controlled tube 61, having a plate or anode 63, a control-grid 65, a screen-grid 66, and a cathode 68. The control-grid 65 is connected to the signal-circuit 57 through a switch SW4 and a 2-megohm resistor R9. The cathode 68 and the screen grid 66 are grounded; and the anode 63 is connected, through the operating-coil 70 of the relay X, to the anode supply-circuit 47 of the rectifier 46. . This anode-circuit 47, as previously explained, is energized from the alternating-current line L1, through the switch SW2, so that the gas-filled tube 61 and the relay-coil 70 both have alternating-current energization.

The gas-filled tube 61 is of a type which fires, or becomes conducting, when its control-grid 65 becomes sufficiently positive at a time when an adequate positive potential is being applied to the anode 63, and after that, the control-grid 65 loses control, and the tube remains conducting until its anode-voltage is reduced substantially to zero or is reversed. Whether the tube 61 refires during the next positive half-cycle of its anode-voltage, depends upon whether its control-grid 65 is again sufficiently positive during that time.

All three tubes, 46, 55, and 61, which I have shown, have heater-type cathodes, which are heated by heaters or filaments which must be suitably energized. To this end, I use a filament-energizing transformer 80, having a primary winding 81 which is energized between the circuit 37 and ground whenever the switch SW1 is closed. This transformer has a 6.3-volt secondary winding 82 which energizes the filament-circuit 83.

Under some operating-conditions, particularly when the thermistor-element 1 has long, shielded leads 3 and 4, or when its cable 24 is unusually long, the range and the utility of the assembly will be improved by the application of a suitable compensating-voltage to the signal-terminal 28 of the bridge 26, properly phased to compensate for, or neutralize, the effect of the capacity of the leads 3 and 4, or of the cable 24, or of the element 1 itself. A simple form of compensator for supplying the requisite leading voltage for this purpose is shown in Fig. 4, wherein the filament-energizing secondary winding 82 is used to energize a 10,000-ohm potentiometer P2, having one terminal grounded as shown at 85, and having an adjustable tap 86 which is connected to the bridge-terminal 28 through a small neutralizing capacitor C5 which may have a capacitance of the order of 300 to 1000 micro-microfarads, depending upon the length of the cable 24. Small changes in the phase of the compensating voltage can be made by adjustments of the potentiometer-tap 86, or larger changes may be made by replacing the neutralizing capacitor C5 with one of a different size.

It is usually desirable to shunt the two output-terminals 33 and 28 of the bridge 26 with a 1-megohm resistor R–10, which is connected across these terminals for the purpose of decreasing the grid-to-ground impedance of the first amplifier 41, 42, 43, thus reducing the effect of any stray capacitive voltages which are picked up by the thermistor-element 1 and its leads 3 and 4.

When the apparatus shown in Fig. 4 is first energized, the switch SW1 is first closed, energizing the filament-circuit 83 for heating up the tubes; and when they are heated, the second switch SW2 may be closed, energizing the plate-circuits of the several tubes.

In the operation of the circuits shown in Fig. 4, the bridge 26 is initially adjusted, by setting the switch 31 and the potentiometer-tap 33, for a desired thermistor-temperature, in accordance with tables or charts prepared by the manufacturer, or else by simply balancing the bridge when the furnace 21 is at a known, desired temperature. When the bridge 26 is balanced, no signal-voltage appears across the two output-terminals 33 and 28, and hence none of the three grid-controlled electronic elements 41, 42, 43; 51, 52, 53; or 61, becomes conducting, because of the negative bias which is applied to the three control-grids 41, 51 and 65 by the biasing-battery BB, through the circuit 33, and the resistance-connections between said circuit 33 and the respective grids.

If the furnace-temperature should change, the resistance of the thermistor-element 1 will change rapidly, as will be seen from the various resistivity-curves which have been plotted in Figs. 5 to 16*a*, and the bridge will become unbalanced in the one direction or the other, according as the temperature increases or decreases. In either event, the output or signal-voltage of the bridge will no longer be zero, and an alternating-current signal-voltage will appear across the bridge-terminals 33 and 28, being approximately in phase with, or slightly leading, the input-voltage into the bridge (which is in phase with the line-voltage), when the thermistor-resistance increases, that is, when the furnace-temperature decreases; and having a phase which is 180° displaced from the phase just described, when the temperature increases above the balance-point temperature. Whatever signal-voltage is developed by an off-balance condition of the bridge 26 is amplified in two stages, by the amplifiers 41, 42, 43 and 51, 52, 53, and is finally supplied, as a highly amplified alternating-current voltage, in the signal-circuit 57.

If, now, the switch SW3 is closed, energizing the voltmeter V, this simple instrument will respond to the magnitude of the signal-voltage, but it will not discriminate as to its phase. Hence, when this instrument is used, the initial bridge-balance must be made at a furnace-temperature which is either higher or lower than any expectable operating-temperature, so that each different voltage-response will be an indication of only one possible furnace-temperature.

If, however, the switch SW4 is closed, as will usually be the case, the initial bridge-balancing operation must be performed at or for the desired operating-temperature of the furnace. Then, if the furnace-temperature should drop very slightly, sometimes as little as a fraction of a degree, sometimes a few degrees, depending upon the sensitivity of the response-circuits and the non-changeability of the thermistor-characteristics, an unbalanced bridge-condition will be obtained, producing a signal-voltage, which is amplified and applied to the control-grid of the gas-filled tube 61. This tube then fires, operating as an electronic switch, becoming conductive during portions of successive positive half-cycles of its anode-circuit supply-voltage, for as long as the bridge 26 remains thus unbalanced. When the gas-filled tube 61 fires, it becomes conducting, and (in the illustrated embodiment) it energizes the mechanical relay X, which energizes the furnace-heater, raising the temperature of the furnace, and lowering the resistance of the thermistor-element 1 until the bridge is again balanced. This causes the signal-output of the bridge to drop to zero, so that the gas-filled tube no longer fires during positive half-cycles of its anode-potential.

If the furnace should overshoot, and become too hot, the bridge 26 will become unbalanced in the other direction, so that its signal-voltage will be negative in phase, instead of positive, or just about 180° out of phase with respect to its phase when the furnace was not hot enough. For this reason, it is important that the "positive" signal, that is, the signal which is positive at nearly the same time when the anode-voltage of the gas-tube 61 is positive (as when the furnace was not hot enough), shall be slightly leading, rather than lagging, with respect to the gas-tube anode-voltage. This "positive" signal-voltage will be slightly leading, with respect to the bridge-energizing secondary voltage of the transformer 35, and hence with respect to the line-voltage of the line L1, because the effective bridge-impedance is nearly, but not quite, pure resistance, being slightly capacitive because of the capacitance of the thermistor 1 and its leads 3, 4 and cable 24. This is true, even when the compensator P2, C5 is not used. The effective impedance of the gas-tube anode-circuit, however, is slightly inductive when it is not substantially infinity, because of the inductance of the relay-coil 70, but even before the gas-tube 61 fires, its open-circuit anode-voltage is simply the line-voltage, neither leading nor lagging the line-voltage, except for the extremely small plate-cathode capacitance of the tube. Hence the "positive" signal-voltage of the bridge 26 (or signal-voltage when the thermistor-resistance is too high, and when the furnace-temperature is too low), will be slightly leading, with respect to the anode-voltage which is impressed upon the gas-filled tube 61.

Now, if the furnace, for any cause, should momentarily become too hot, each negative half-cycle of the signal-voltage, which is produced by the bridge, will commence slightly before the corresponding positive half-cycle of the anode-voltage of the gas-filled tube 61. Since the gas-tube 61 cannot fire until its signal-voltage or control-voltage is positive at the same time when its anode-voltage is positive, the tube will not fire (if at all), until nearly the end of a positive half-cycle of its anode-voltage, when the negative control-voltage half-cycle reverses and becomes positive. Since the gas-tube automatically extinguishes itself at or near the end of any positive half-cycle of anode-voltage during which it has been fired, the very brief impulse which the relay-coil 70 receives (if it receives any at all), will not be sufficient to pick up the relay-contacts 23. Hence, there will be no effective response of the gas-tube-and-relay combination 61, 70, if the furnace should overshoot and momentarily become too hot.

While I have illustrated my invention in connection with but a single form of electronic-circuit assembly, and while I have described the composition and the method of preparing the thermistor-element, with preferred ingredients, and details as to preferred proportions, preferred manufacturing-steps, and preferred manufacturing times and temperatures for the various steps in the process, which I have found to produce the best thermistors, having constant, temperature-stable, non-drifting, reproducible, temperature-resistance characteristics in the various temperature-ranges, resistivity-ranges, and characteristic curve-shapes which have been described, I wish it to be understood that I am not altogether limited to these precise details, as many changes may be made, in the way of omitting certain refinements, or adding others, or in the way of substituting equivalents for one thing or another, without departing from the essential spirit of my invention, in its broadest aspects. I desire, therefore, that the appended claims shall be accorded the broadest interpretation consistent with their language.

I claim as my invention:

1. A thermistor-element comprising a piece of sintered composition-material consisting mainly of sintered chromic oxide, with a metal-oxide added ingredient mixed therewith, said added ingredient being selected from the group consisting of (*a*) not more than about 8% of a sintered oxide of barium, (*b*) not more than about 14% of a sintered oxide of cobalt, (*c*) not more than about 32% of a sintered oxide of iron, (*d*) not more than about 7% of a sintered oxide of nickel, (*e*) not more than 50% of a sintered oxide of thorium, (*f*) not more than about 8% of a sintered oxide of titanium, (*g*) not more than about 17% of a sintered oxide of tungsten, (*h*) not more than about 8% of a sintered oxide of vanadium, and (*i*) not more than about 16% of a sintered oxide of zirconium, and terminal-means for making a good electrical contact with the sintered composition-material for bringing electric current into and of the same.

2. A thermistor comprising a piece of sintered metal-oxide composition-material having substantially no non-oxide ingredient, at least 50% of its composition being chromic oxide, and the remainder of its composition consisting of a metal-oxide added ingredient mixed therewith, said added ingredient being selected from the group consisting of (*a*) not more than about 8% of barium oxide, (*b*) not more than about 14% of cobaltic oxide or not more than about 13% of cobaltous oxide, (*c*) not more than about 32% of ferric oxide, (*d*) not more than about 7% of nickel oxide, (*e*) not more than 50% of thorium dioxide, (*f*) not more than about 8% of titanium dioxide or not more than about 10% of a mixture of titanium dioxide and calcium oxide, (*g*) not more than about 16% of tungsten dioxide or not more than about 17% of tungsten trioxide, (*h*) not more than about 8% of an oxide of vanadium, and (*i*) not more than about 16% of zirconium dioxide, said piece of composition material having high-melting-point noble-metal terminals permanently bonded thereto.

3. A thermistor-element comprising a thin, elongated strip of a sintered mixture of metal-oxides of which chromic oxide comprises at least as much as 50%, said strip having a terminal-connection at each end, said strip having a thickness of the order of 0.2 to 15 millimeters and having a form-factor (or ratio of area to effective length), of the order of 0.01 to 0.5 in centimeters, the metal-oxides of which the strip is composed including an activating oxide of a metal other than chromium, said activating oxide having the property of so reducing the resistivity of the sintered mixture (as compared with the resistivity of pure sintered chromic oxide) that the resistance of the thermistor-element, at the minimum effective operating-temperature of the element, shall be materially less than one megohm, said minimum operating temperature being at least as low as 0° C.

4. A thermistor-element comprising a thin, elongated strip of a sintered mixture of metal-oxides of which chromic oxide comprises at least as much as 50%, said strip having a terminal-connection at each end, said strip having a thickness of the order of 0.2 to 15 millimeters and having a form-factor (or ratio of area to effective length), of the order of 0.01 to 0.5 in centimeters, the metal-oxides of which the strip is composed including a poisoning oxide of a metal other than chromium, said poisoning oxide having the property of so increasing the resistivity of the sintered mixture (as compared with the resistivity of pure sintered chromic oxide) that the resistance of the thermistor-element, at the maximum effective operating-temperature of the element, shall be materially greater than 5 ohms, said maximum operating-temperature being at least as high as 1000° C.

5. A thermistor-element comprising a sintered composition-material consisting substantially entirely of chromic oxide and nickel oxide, the nickel oxide being present in proportions not more than about 7%.

6. A thermistor-element comprising a sintered composition-material consisting substantially entirely of sintered chromic oxide and a sintered oxide of cobalt, the oxide of cobalt being present in proportions not more than about 14%.

7. The method of making a heat-resistance composition-body, comprising the steps of adding, to a dry, powdered, heat-resistant material, a few drops per cc. of a solution or mixture composed of a heat-dissociable adhesive-agent in or with a volatile deflocculating agent, mixing the resulting wet mixture to form a heavy paste and continuing the mixing until the heavy paste becomes a fairly-well-dried-out slip, forming said slip into a still-further-dried-out, coherent, shape-holding mass of a predetermined shape, prefiring said mass at a temperature suitable for thoroughly driving off said adhesive agent as well as any remaining traces of said deflocculating agent, and subsequently firing said mass at a still higher temperature suitable for sintering, and holding said mass at said sintering-temperature until a well-sintered body of reproducible characteristics is obtained.

8. The method of applying a terminal-connection to a semiconducting heat-resistant composition body, comprising the steps of applying, to a portion of the surface of the composition-body, a small quantity of a paste of a high-melting-point noble metal, covered by high-melting-point noble-metal foil, prefiring the resulting body slowly at a temperature suitable for drying out the paste, and subsequently finish-firing said body at a higher temperature suitable for completing the bond between the noble-metal terminal and the composition-body.

9. The method of making a thermistor, comprising the steps of adding, to a dry, powdered metal-oxide material, consisting mainly of chromic oxide, a few drops per cc. of a solution or mixture composed of a heat-dissociable adhesive-agent in or with a volatile deflocculating agent, mixing the resulting wet mixture to form a heavy paste and continuing the mixing until the heavy paste becomes a fairly-well-dried-out slip, forming said slip into a still-further-dried-out, coherent, shape-holding mass of predetermined shape, prefiring said mass to a temperature suitable for thoroughly driving off said adhesive agent as well as any remaining traces of said deflocculating agent, subsequently firing said mass at a still higher sintering-temperature which is not materially less than 1450° C. but which is considerably less than 1900° C., and holding said mass at said sintering-temperature until a well-sintered body of reproducible characteristics is obtained, taking a piece of such sintered composition-material, of a size and shape having an effective resistance which is higher than 5 ohms and lower than 1 megohm throughout the useful temperature-range of the thermistor, and applying, to each terminal-end thereof, a small quantity of a paste of a high-melting-point noble metal, covered by high-melting-point noble-metal foil, prefiring the resulting piece at a temperature suitable for drying out the paste, and subsequently finish-firing said piece at a higher bonding-temperature which is of the order of 1200° C.

10. The method of making a thermistor, comprising the steps of adding, to a dry, powdered metal-oxide material, consisting mainly of chromic oxide, a few drops per cc. of a solution or mixture composed of a heat-dissociable adhesive-agent in or with a volatile deflocculating agent, mixing the resulting wet mixture to form a heavy paste and continuing the mixing until the heavy paste becomes a fairly-well-dried-out slip, forming said slip into a still-further-dried-out, coherent, shape-holding mass of predetermined shape, prefiring said mass at a temperature suitable for thoroughly driving off said adhesive agent as well as any remaining traces of said deflocculating agent, subsequently firing said mass at a still higher sintering-temperature which is not materially less than 1450° C. but which is not materially greater than 1500° C., and holding said mass at said sintering-temperature until a well-sintered body of reproducible characteristics is obtained, taking a piece of such sintered composition-material, of a size and shape having an effective resistance which is higher than 5 ohms and lower than 1 megohm throughout the useful temperature-range of the thermistor, and applying, to each terminal-end thereof, a small quantity of a paste of a high-melting-point noble metal, covered by high-melting-point noble-metal foil, prefiring the resulting piece at a temperature suitable for drying out the paste, and subsequently finish-firing said piece at a higher bonding-temperature which is of the order of 1200° C.

11. The method of making a thermistor, comprising the steps of mixing a plurality of powdered metal oxides, including at least 45% chromic oxide and not substantially more than 10% bismuth trioxide, forming said mixture into a thin cake, and firing said cake at a temperature suitable for sintering chromic oxide.

12. A thermistor-element having the following properties: the ability to hold a calibration which is acceptable for temperature measurement and control, and the ability to be manufactured in quantity production, with reasonable uniformity of characteristics, and with acceptable mechanical strength and durability; said thermistor-element comprising a piece of sintered composition-material consisting mainly of sintered chromic oxide, with a metal-oxide added ingredient mixed therewith, the principal active added ingredient which contributes to said properties being selected from the group consisting of (*a*) not more than about 8% of a sintered oxide of barium, (*b*) not more than about 14% of a sintered oxide of cobalt, (*c*) not more than about 32% of a sintered oxide of iron, (*d*) not more than about 7% of a sintered oxide of nickel, (*e*) not more than 50% of a sintered oxide of thorium, (*f*) not more than about 8% of a sintered oxide titanium, (*g*) not more than about 17% of a sintered oxide of tungsten, (*h*) not more than about 8% of a sintered oxide of vanadium, and (*i*) not more than about 16% of a sintered oxide of zirconium, and terminal-means for making a good electrical contact with the sintered composition-material for bringing electric currents into and out of the same, and said sintered composition-material having no active ingredient of any kind or in any amount which would destroy the aforesaid properties.

13. A thermistor having the following properties: the ability to hold a calibration which is acceptable for temperature measurement and control, and the ability to be manufactured in quantity production, with reasonable uniformity of characteristics, and with acceptable mechanical strength and durability; said thermistor comprising a piece of sintered metal-oxide composition-material having substantially no non-oxide ingredient, at least 50% of its composition being chromic oxide, and the remainder of its composition consisting of a metal-oxide added ingredient mixed therewith, the principal active added ingredient which contributes to said properties being selected from the group consisting of (*a*) not more than about 8% of barium oxide, (*b*) not more than about 14% of cobaltic oxide or not more than about 13% of cobaltous oxide, (*c*) not more than about 32% of ferric oxide, (*d*) not more than about 7% of nickel oxide, (*e*) not more than 50% of thorium dioxide, (*f*) not more than about 8% of titanium dioxide or not more than about 10% of a mixture of titanium dioxide and calcium oxide, (*g*) not more than about 16% of tungsten dioxide or not more than about 17% of tungsten trioxide, (*h*) not more than about 8% of an oxide of vanadium, and (*i*) not more than about 16% of zirconium dioxide, said piece of composition material having high-melting-point noble-metal terminals permanently bonded thereto, and said sintered composition-material having no active ingredients of any kind or in any amount which would destroy the aforesaid properties.

14. A thermistor-element having the following properties: the ability to hold a calibration which is acceptable for temperature measurement and control, and the ability to be manufactured in quantity production, with reasonable uniformity of characteristics, and with acceptable mechanical strength and durability; said thermistor-element comprising a sintered composition-material, of which the principal active ingredients, which contribute to said properties, consist substantially entirely of chromic oxide and nickel oxide, the nickel oxide being present in proportions not more than about 7%, and said sintered composition material having no active ingredient of any kind or in any amount which would destroy the aforesaid properties.

15. A thermistor-element having the following properties: the ability to hold a calibration which is acceptable for temperature measurement and control, and the ability to be manufactured in quantity production, with reasonable uniformity of characteristics, and with acceptable mechanical strength and durability; said thermistor-element comprising a sintered composition-material, of which the principal active ingredients, which contribute to said properties, consist substantially entirely of sintered chromic oxide and a sintered oxide of cobalt, the oxide of cobalt being present in proportions not more than about 14%, and said sintered composition-material having no active ingredient of any kind or in any amount which would destroy the aforesaid properties.

References Cited in the file of this patent

UNITED STATES PATENTS

| | | |
|---|---|---|
| 648,518 | Ochs | May 1, 1900 |
| 1,977,698 | Scott | Oct. 23, 1934 |
| 2,122,960 | Schwartzwalder | July 5, 1938 |
| 2,258,646 | Grisdale | Oct. 14, 1941 |
| 2,261,412 | Reeve | Nov. 4, 1941 |
| 2,271,975 | Hall | Feb. 3, 1942 |
| 2,278,072 | Gould et al. | Mar. 31, 1942 |
| 2,294,755 | Inutsuka et al. | Sept. 1, 1942 |
| 2,294,756 | Inutsuka et al. | Sept. 1, 1942 |
| 2,329,511 | Christensen | Sept. 14, 1943 |
| 2,407,251 | Christensen | Sept. 10, 1946 |
| 2,452,932 | Johnson | Nov. 2, 1948 |

FOREIGN PATENTS

| | | |
|---|---|---|
| 368,272 | Great Britain | Feb. 29, 1932 |
| 464,274 | Great Britain | Apr. 12, 1937 |
| 792,828 | France | Jan. 11, 1936 |